Figure 1:
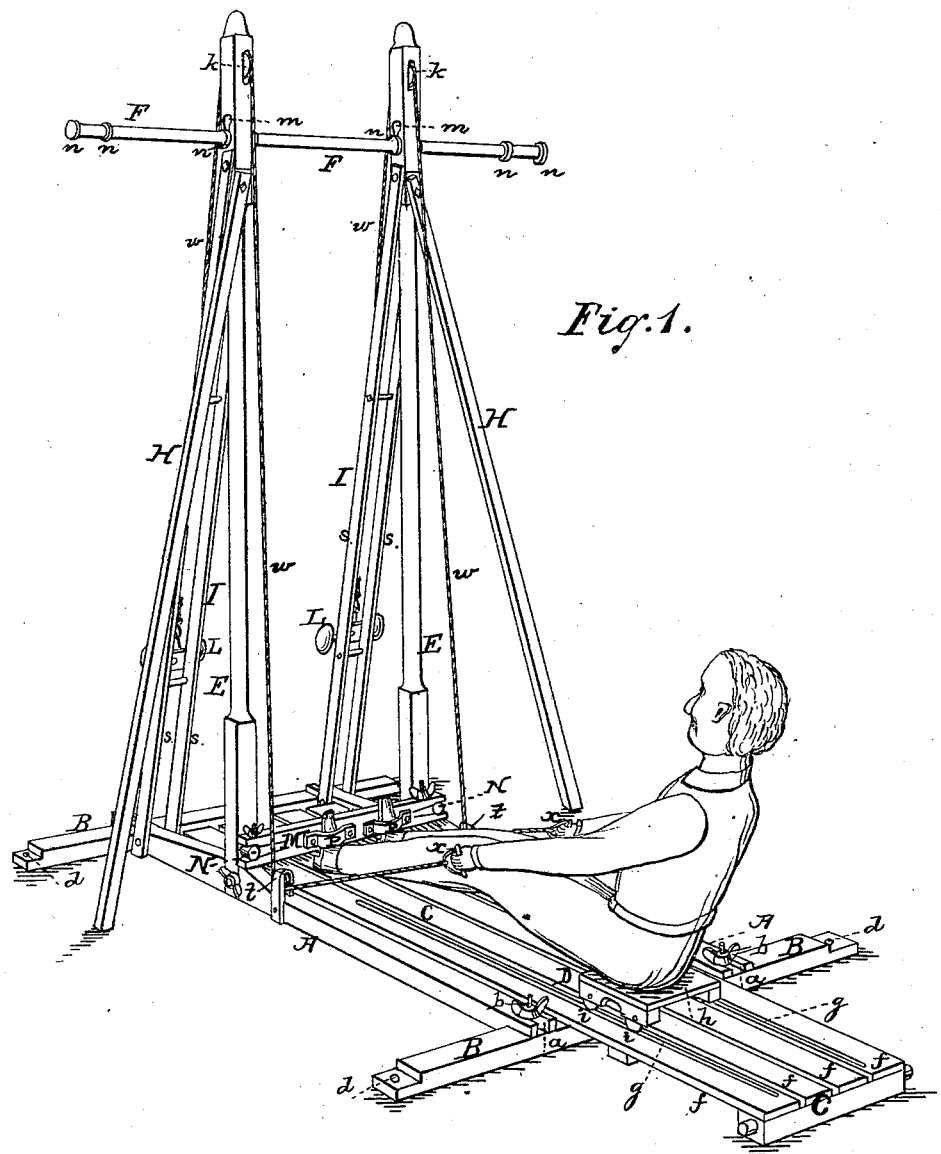

(No Model.)  
4 Sheets—Sheet 1.

J. H. & C. H. GIFFORD.
Combined Portable Health Exercising and Gymnastic Apparatus.

No. 232,022.  
Patented Sept. 7, 1880.

WITNESSES:  
Chas. Olsell  
W. W. Douglass

INVENTORS:  
Jesse H. Gifford  
and  
Charles H. Gifford  
BY Cox and Cox  
ATTORNEYS.

(No Model.) 4 Sheets—Sheet 2.
J. H. & C. H. GIFFORD.
Combined Portable Health Exercising and Gymnastic Apparatus.
No. 232,022. Patented Sept. 7, 1880.
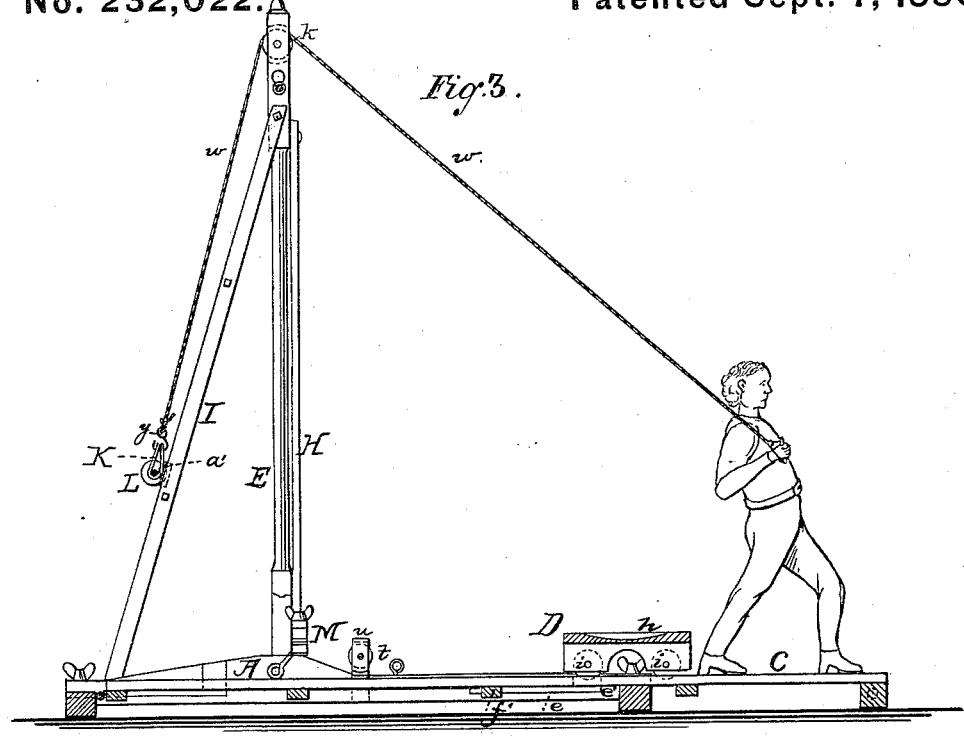
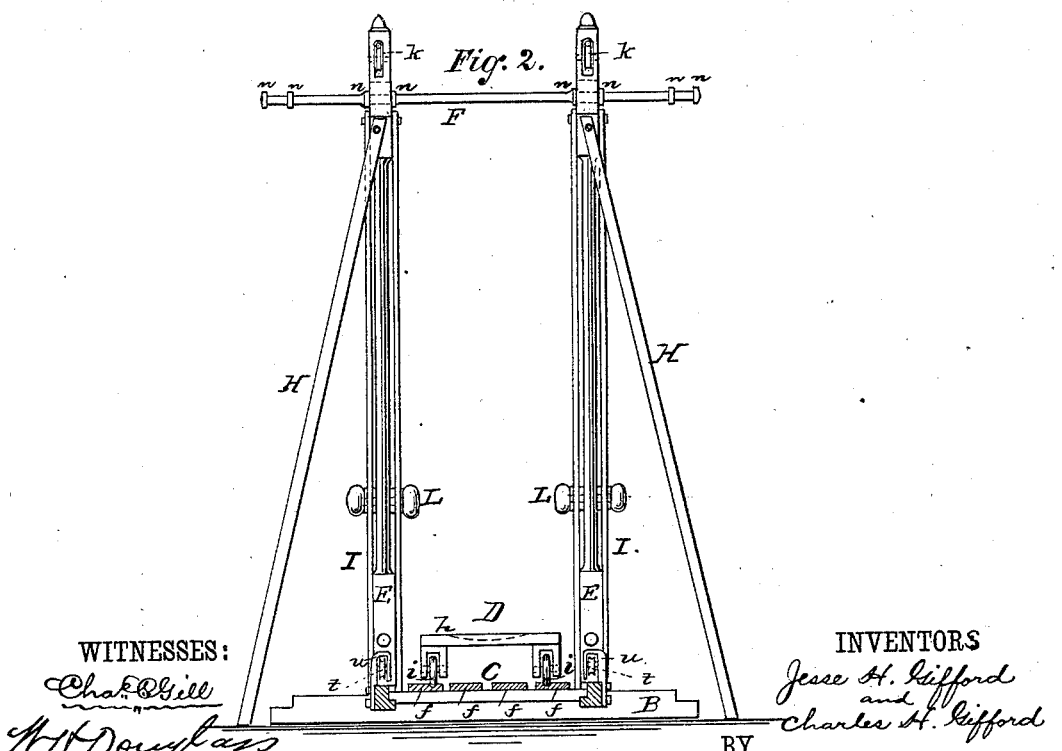
WITNESSES:
Chas. E. Gill
W. H. Douglass
INVENTORS
Jesse H. Gifford
and
Charles H. Gifford
BY
Cox and Cox
ATTORNEYS.

(No Model.) 4 Sheets—Sheet 3.
J. H. & C. H. GIFFORD.
Combined Portable Health Exercising and
Gymnastic Apparatus.
No. 232,022. Patented Sept. 7, 1880.
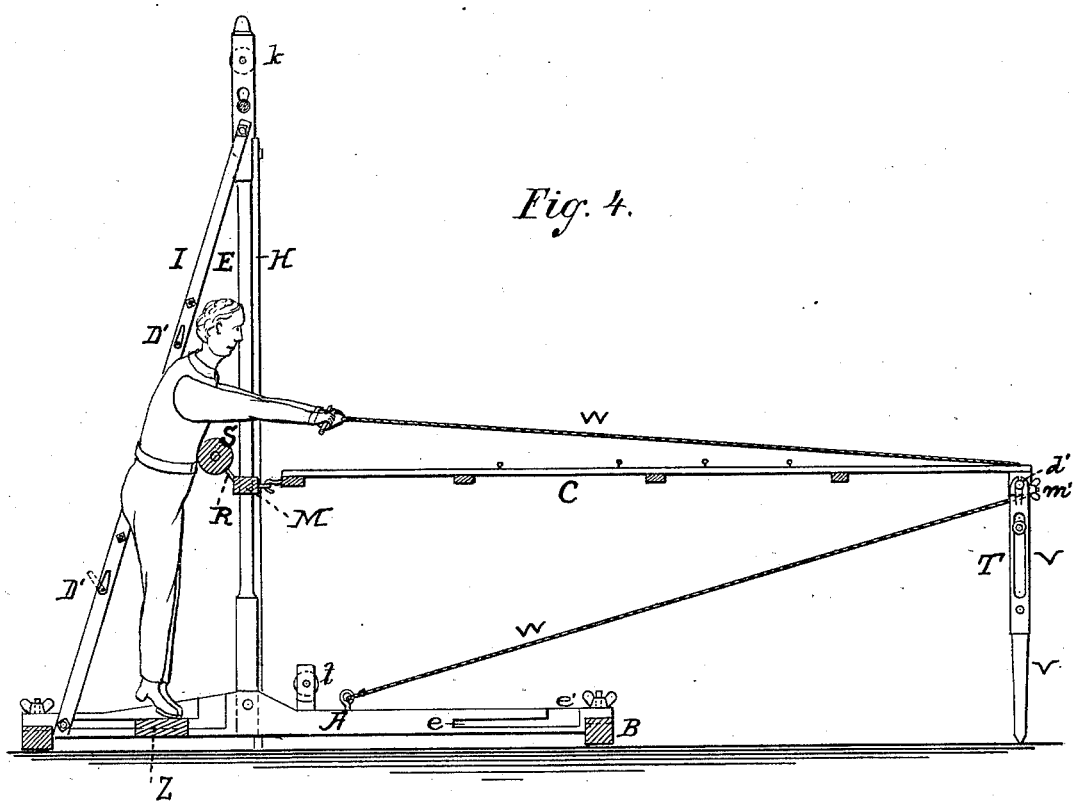
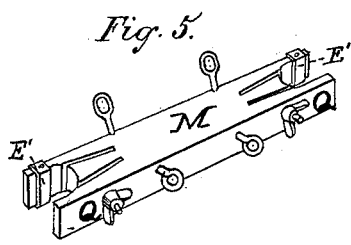
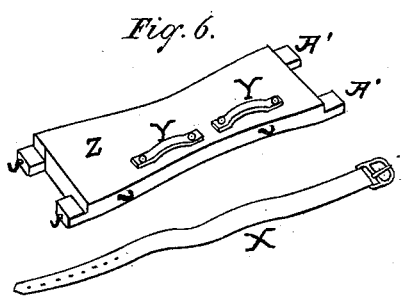
WITNESSES:
Chas. Q. Gill
W. H. Douglass.
INVENTORS
Jesse H. Gifford
and
Charles H. Gifford
BY
Cox & Cox
ATTORNEYS.

(No Model.) 4 Sheets—Sheet 4.
J. H. & C. H. GIFFORD.
Combined Portable Health Exercising and
Gymnastic Apparatus.
No. 232,022. Patented Sept. 7, 1880.
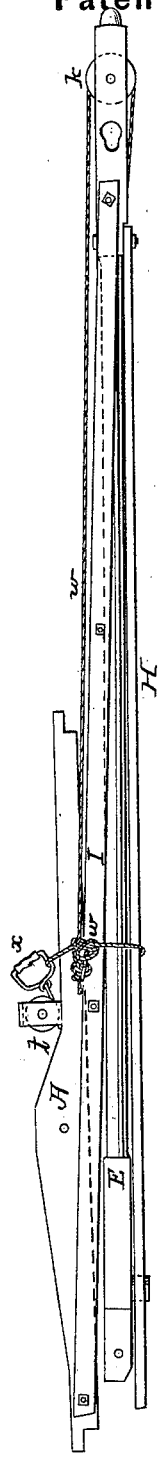
WITNESSES:
Chas. P. Gill
W. H. Douglass.
INVENTORS:
Jesse H. Gifford
and
Charles H. Gifford
BY Cox and Cox
ATTORNEYS.

UNITED STATES PATENT OFFICE.

JESSE H. GIFFORD AND CHARLES H. GIFFORD, OF NEW YORK, N. Y.

COMBINED PORTABLE HEALTH-EXERCISING AND GYMNASTIC APPARATUS.

SPECIFICATION forming part of Letters Patent No. 232,022, dated September 7, 1880.

Application filed May 17, 1880. (No model.)

*To all whom it may concern:*

Be it known that we, JESSE H. GIFFORD and CHARLES H. GIFFORD, of New York, in the county of New York and State of New York, have invented a new and useful Improvement in Combined Portable Health-Exercising and Gymnastic Apparatus, of which the following is a specification, reference being had to the accompanying drawings.

The invention relates to an improved combined portable health-exercising and gymnastic apparatus; and it consists in the construction, hereinafter fully described, and particularly pointed out in the claims.

The object of the invention is to produce an apparatus which will embrace the elements of a rowing-machine, chest-bars, horizontal bar, and means for exercising all the other parts of the body not affected by the devices mentioned, and which apparatus will be capable of being converted into a bed, a crib having a lateral motion, an adjustable table, a chair, &c., all as hereinafter more fully set forth.

Referring to the accompanying drawings, Figure 1 is a perspective view of a machine embodying the elements of the invention. Fig. 2 is a front view of same, partly in section. Fig. 3 is a side view, partly in section, showing the machine in use for pulling weights. Fig. 4 is a similar view, exhibiting the machine in position for the stomach and back roller exercise. Fig. 5 is a perspective view of the bar M. Fig. 6 is a perspective view of the seat Z and strap X. Fig. 7 is a plan view, showing the machine folded.

The base of the apparatus consists of the side bars, A, the end bars, B, and the platform C. The side bars, A, are mortised at their ends, so as to fit over the end bars, where they are provided with slots $a$, which, when the side bars are in position, fit over threaded apertures $d$ in the end bars, through which and the said slots thumb-screws $b$ will be passed for the purpose of uniting in an adjustable manner the sides and ends of the base of the apparatus. A series of apertures, $d$, may be provided in the end bars, B, in order that the side bars, A, may be adjusted laterally, so as to either increase or diminish the width of the machine, according to the size of the person using it or the particular exercise to be performed.

Upon the lower inner edges of the side bars, A, are formed the grooves $e$, having suitable inlets $e'$, into which the ends of the cleats $f'$ on the platform C pass and enter the grooves, wherein they are capable of a horizontally-sliding movement.

The platform C will be of suitable length to effect the objects required of it, and will be composed, preferably, of slats or strips $f$, connected by cross-pieces. Upon the upper surface of the strips $f$ are cut the grooves $g$, which run longitudinally with the platform and nearly its entire length, forming a track, upon which the sliding seat D is placed. The seat D consists, preferably, of the rectangular top $h$, having sides, in which are pivoted the sheave-wheels $i$, which extend a suitable distance below the sides of the seat and are convex on their peripheries.

When the seat is in position on the platform C the wheels $i$ will enter the grooves $g$ and travel backward and forward therein when the seat is actuated. The depth and width of the grooves $g$ will be of somewhat greater dimensions than the convex periphery of the wheels $i$, in order that the seat will not leave the track under any ordinary usage.

If preferred, in lieu of the grooves $g$, iron rods may be secured upon the platform so as to form the track, and the periphery of the wheels $i$ suitably conformed to travel over them.

The platform C, when the machine is in use, may be arranged between the side and end bars of the bars of the apparatus, or it may be drawn partly outward directly in front thereof, according to the object to which it is to be applied.

Upon the side bars, A, at about their center or slightly in rear thereof, are formed sockets in which the lower ends of the chest-bars E are inserted and retained therein by screws or otherwise, as may be deemed expedient. The chest-bars E extend upward parallel with each other a suitable distance, and are supplied, adjacent to their upper ends, with the pulley-wheels $k$, hereinafter mentioned, and below these with the slots or elongated apertures $m$, the upper portions of which are of somewhat greater dimensions than the lower portions. In the slots $m$ is placed the horizontal bar F, which is first inserted in the upper or larger portion of the slots and then drawn in the smaller portions thereof, where it is held firmly in position. Upon the bar F, adjacent to its ends, are formed the annular shoulders n, which, when the bar is in position, prevent it moving laterally or working out of the slots m. Two sets of shoulders, n, are shown in the present instance, which serve to secure the bars F, both when the sides A are adjusted at the extremities of the ends B or brought nearer together.

Upon the front edge of the upper portion of the chest-bars E are secured, by a bolt or in any other suitable manner, the bars H, which incline outward and downward, one from each chest-bar, and serve to brace the apparatus in a vertical position. The upper ends of the bars H are secured so as to permit the bars to fold against the chest-bars E when the parts of the machine are folded for shipment, and the lower ends of the bars H, when the apparatus is in condition for use, will be sufficiently far from the sides A to serve as effectual, the extremities being pressed closely against the surface upon which the machine rests.

Upon the sides of the chest-bars E, near their upper ends, are secured, preferably by means of a bolt, the upper ends of the tramways I, which consist, in the present instance, of two bars, s, for each, connected by suitable bolts bearing wooden thimbles, for the purpose of strengthening them and preserving their relation toward each other. The lower ends of the bars s are fastened by bolts or otherwise upon opposite sides of the rear ends of the bars A. Thus the tramways will incline downward and rearward parallel with each other from the upper portion of the chest-bars to the ends of the sides A.

Adjacent to and in front of the lower extremities of the chest-bars E are arranged the pulley-wheels t, mounted in the hook-shaped casings u, which have their longer sides secured to the sides of the bars A. The shorter sides of the casings u project downward upon the inner surface of and a suitable distance below the pulleys t, the object being that their extremities shall approach within about a half or three-quarters of an inch of the bars A, which will prevent the ropes leaving the pulleys except when they are passed from under the shorter arms of the casing u.

Over the pulleys k and under the pulleys t are then placed the ropes w, which will be of such length, preferably, as to extend from the lower ends of the tramways I up over the pulleys k and down under the pulleys t. At the front ends of the ropes w are attached in any convenient manner the handles x, which will be of suitable size and configuration to be readily grasped by the hand.

Upon the ends of the ropes w, in rear of the machine, are fastened the hooks y, upon which are secured the ends of the bands K, inclosing the handles of the dumb-bells L. The ends of the bands K, which will preferably consist of leather, though we do not limit ourselves to its use alone, are provided with apertures by means of which one end is first secured on the hook, and the other end then passed around the handle of the dumb-bell, and afterward secured on the same hook.

It is plain that the bands K may be loosened and a pair of dumb-bells of any desired weight secured upon the rear ends of ropes w by them. The portions of the bands K which rest against the tramways will preferably be provided with pieces of thick leather a', which will protect the bands from chafing when the apparatus is operated.

A foot-piece, M, is adjusted across the space between the chest-bars, near their base, its ends being fastened by set-screws upon the knobs N, secured upon the lower front edges of the chest-bars in close relation to the sides A. The foot-piece M consists of a plain bar of wood or other suitable material provided with suitable toe-straps P, and having its ends bifurcated and slit, as shown in Fig. 5, so as to permit the said ends to be compressed upon their support by means of the set-screw and bolt Q, as shown with sufficient accuracy in said Fig. 5.

When the apparatus is arranged as above described, the platform C being drawn out to the front and the seat D set upon the same, the wheels i being in the grooves g, it is in proper form for a rowing-machine. The operator will sit upon the seat D, place his toes beneath the straps P, and draw the dumb-bells L upward on the tramways I by means of the handles x, secured on the ends of the ropes w. After the dumb-bells or weights L have been drawn upward as far as the sweep of the operator's arms can carry the handles x toward the front, the exertion is released and the weights allowed to gradually descend on the tramways, which will draw the seat D and the operator inward toward the chest-bars, in convenient position for him to again elevate the weights. This movement, which is the same as that experienced in rowing a boat, may be continued as long as desired.

By placing the seat D upon wheels there is no friction to overcome, and the seat consequently travels backward and forward easily without effecting a strain on the operator and without necessitating the use of oil or grease on the track.

After the rowing exercise has been practiced as long as desired the seat D is removed, and the ropes w passed from the pulleys t by slipping them under the shorter arms of the casings u, when the apparatus will be in proper condition to be employed for the exercise known as "pulling-weights." The operator will in this exercise stand upon the platform C, with either his face or back toward the chest-bars, and draw the weights L up the tramways I, and allowing them to return, by the usual movements of the arms practiced in pulling weights. Upon the completion of this exercise the ropes $w$ are again inserted under the pulleys $t$, when the apparatus may be used for chest-bar or horizontal-bar exercises.

For a stomach and back roller I arrange the apparatus as follows: The bar M is loosened from the knobs N, and secured in like manner in a horizontal position between the chest-bars E at a suitable elevation. Upon the rear edge of the bar M is then mounted, in journals R, the roller S, which will be about six inches in diameter, and covered with a matting of any suitable description. After the roller S has been arranged the platform C will be elevated and its rear end hooked upon eyes secured on the front edge of the bar M, suitable hooks being attached to the edge of the platform. When the front portion of the platform C is elevated, the legs T, which, when the platform is down, fold against its sides, will assume a vertical position and serve as supports. The legs T consist of two or more sliding sections, V, having corresponding vertical slots in which set-screws are arranged, so as to enable the operator to regulate the length of the legs at will. The upper ends of the legs T will be provided with apertures having a narrow slot, $d'$, leading from them, by which they may be hung upon knobs or projections on the sides of the platform at its front ends, and retained by the set-screws $m'$. The length of the legs T will be adjusted by the set-screw to bring the front end of the platform C upon a level with its rear end.

A rope, W, is passed from each side A up over the front end of the platform and rearward sufficiently far to permit the operator, leaning forward over the roller S, to grasp the handles on their ends with his hands. The lower ends of the ropes W will preferably be provided with snap-hooks, which will engage eyes on the sides A.

The health-exercise of rolling the back and stomach is accomplished by the operator leaning over the roller S, either on the back or face, and drawing himself or herself over the same any suitable number of times by pulling on the ropes W. In lieu of employing the ropes W, we may make the ropes $w$ answer for this exercise by simply loosening the bands K and removing the dumb-bells L, when the ropes $w$ may be drawn forward until the bands K are at the upper ends of the chest-bars, which will bring the handles $x$ so far in front of the apparatus that they may be thrown over the platform C and take the place of the ropes W, thus avoiding the use of two sets of ropes.

After this exercise has been continued a sufficient length of time the stationary back and loin exercise may be accomplished by adjusting the strap X around the body and across the journals R, drawing the operator close to the roller S. The fore part of the feet of the operator should be inserted in the toe-straps Y, secured upon the under surface of the seat Z, hereinafter described, which is placed between the sides A at the base of the chest-bars. The legs of the operator being thus held, the exercise is consummated by his bending the body forward and sidewise and backward, according to the well-established movements in this exercise.

The apparatus may be converted in a physician's adjustable operating-table by simply dropping the ropes W or $w$, according to which is used. The front end of the table or platform C may be inclined at will by simply adjusting the legs T, and the rear end may be placed upon any desired inclination by suitably adjusting the bar M between the chest-bars. The platform C thus secured would also answer for a bed to sleep upon.

For transferring the bed into a cradle or crib having a lateral oscillatory movement, we loosen the hooks at the rear end of the platform C, and then place said end upon the bar M, and secure it there by passing a bolt or headed pin centrally through it and the bar M. We then remove or fold the legs inward and support the front end of the platform by cords or ropes, which will pass from near each corner thereof to the center of the horizontal bar F. The platform thus secured may be oscillated laterally upon the bolt securing it upon the bar M. This effectually overcomes the objection to the rocking movement of the ordinary child's crib.

If the platform C is lowered to a suitable point nearer the floor, by adjusting the bar M lower down between the chest-bars E, and the legs T shortened, a durable spring-board will be presented for the use of the operator.

An adjustable stool or bench for back, liver, and chest exercise may now be formed out of the apparatus as follows: The platform C is detached from the bar M and placed between the bars A at the base of the machine, and the seat Z secured to the bar by hooks fastened upon its end. The loose end of the seat Z will be supported by the legs T, which will be hung upon the knobs or projections A' formed upon the end of the seat. The projections A' are of rectangular form in the present instance, but will preferably be rounded, so as to snugly fit the apertures in the upper ends of the legs T. The seat Z will be covered with a suitable matting, and will, preferably, be concave on its sides, so that the operator may straddle it without inconvenience, with his face toward the chest-bars, and bend his body backward and sidewise, and in other positions known in the chest and liver exercise. The operator may also lie across the stool Z, and assume other positions consonant with this exercise.

A chair may be formed by elevating the bar M between the chest-bars and hooking the rear end of the platform C onto it in the manner before described, allowing the front end of the platform C to rest upon the ground. The platform in this position forms the back of the chair, the seat of which is constructed by hooking the seat Z at its side into suitable eyes secured on the platform. The outer side of the seat Z will be secured by cords provided with snap-hooks passing from its edges to suitable points on the platform, where they will be attached to eyes secured thereon. Preferably, a series of eyes will be supplied on the platform, in order that the height and inclination of the seat Z may be adjusted at will.

For the purpose of constructing a ladder-trapeze we shall employ what is known as a "collapsing-ladder," having hooks at one end, which will be hooked over the horizontal bar, and a means at the other end for attaching the adjustable legs T. The sides of the ladder will be rounded on their outer faces, and the rungs will be attached to one side and arranged to fit in notches on the other side. Thus the sides may be separated and the rungs folded in, forming arm-walking bars.

Upon the sides of the tramways I may be attached buttons D', which, when the apparatus is not in use for other purposes, may be turned outward, and the tramways then used as a student's or artist's easel.

Upon the bifurcated ends of the bar M are secured small pieces of rubber packing E', which prevent any sliding or slipping when the bar is adjusted upon the chest-bars.

Small pieces of packing may be secured at the base of the tramways for the purpose of preventing the weights L, when they descend, from jarring the apparatus.

The apparatus herein described may be folded, as shown in Fig. 7, and when in use sets perfectly solid, and need not be secured to the floor unless it is constructed very large and submitted to violent performances.

What we claim as our invention, and desire to secure by Letters Patent, is—

1. In an exercising apparatus, the combination, with the chest-bars, of the horizontal bar secured across their upper ends, tramways which incline from their said ends downward and rearward, and weights placed on the tramways and secured to ropes which pass over pulleys at the upper ends of the apparatus and forward in proper relation to be grasped by the operator, substantially as specified.

2. In an exercising apparatus, the combination, with the chest-bars, of the horizontal bar secured across their upper ends, tramways which pass from their said ends downward and rearward, weights placed upon the tramways attached to ropes which pass over pulleys at the top of the apparatus and downward under pulleys at the base thereof, where they are supplied with handles and with a sliding seat mounted upon a track in front of the chest-bars, substantially as set forth.

3. In an exercising apparatus, a roller mounted upon a horizontal bar, adjustable between two vertical bars, and a platform secured to the horizontal bar, in combination, substantially as described.

4. In an exercising apparatus, a platform having its front end supported upon legs and its rear end secured upon a horizontal bar adjustable between two vertical bars, substantially as set forth.

5. In an exercising apparatus, a stool or bench having its front end supported by adjustable legs and its rear end secured upon a horizontal bar capable of vertical adjustment between two vertical bars, substantially as set forth.

6. The chest-bar E, extending upward from the sides A, and connected by a horizontal bar, F, in combination with the braces H, tramways I, weights L, ropes w, platform C, and sliding seat D, substantially as specified.

7. The adjustable bar M, having bifurcated and slotted ends and provided with the bolts Q, whereby it may be secured to the knobs N or adjusted as a support between the chest-bars, substantially as specified.

8. In an exercising apparatus, the horizontal bar F, having shoulders n, in combination with the chest-bars E and sides A, and ends B, having recessed ends, substantially as described.

9. In an exercising apparatus, the inclined tramways I, in combination with the ropes w and bands K, whereby dumb-bells of different weights may be secured to the ropes, substantially as specified.

In testimony that we claim the foregoing improvement in combined portable health-exercising and gymnastic apparatus, as above described, we have hereunto set our hands this 15th day of May, 1880.

JESSE H. GIFFORD.
CHAS. H. GIFFORD.

Witnesses:
E. D. GRANT,
CHAS. C. GILL.